United States Patent Office 3,535,259
Patented Oct. 20, 1970

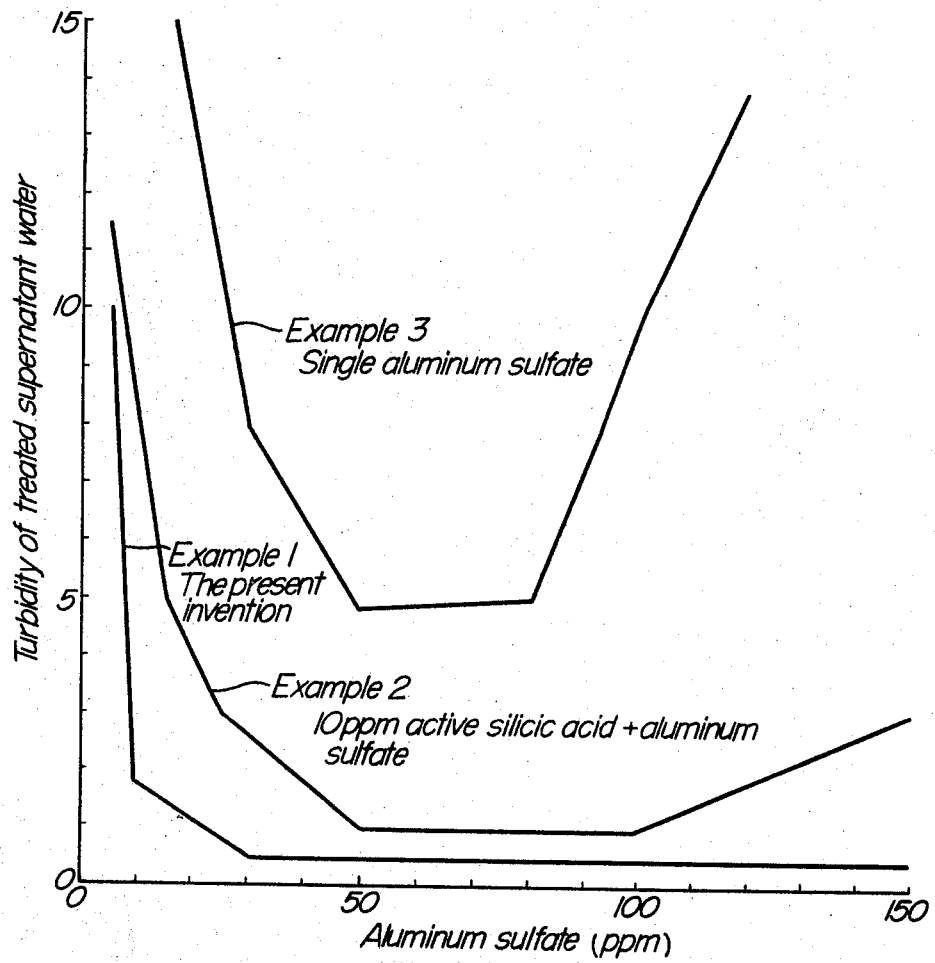

3,535,259
PROCESS AND FLOCCULATING AGENT PRODUCED THEREBY OF THE REACTION PRODUCTS OF SULFURIC ACID AND ALLOPHANE
Masakazu Horioka, Sendai-shi, Japan, assignor to Yugen Kaisha Horiokajosuikigyo Kenkyusho, Sendaishi, Japan, and Ebara-Infilco Kabushiki Kaisha, Tokyo, Japan, both corporations of Japan
Filed June 15, 1967, Ser. No. 646,341
Claims priority, application Japan, June 25, 1966, 41/41,526
Int. Cl. C01b *33/14;* C01f *7/26;* C02b *1/20*
U.S. Cl. 252—175
2 Claims

ABSTRACT OF THE DISCLOSURE

A process for preparing a high sufficient flocculating agent useful for coagulation and sedimentation treatment of various aqueous suspensions. Natural allophane or clay minerals similar thereto are used as starting material. They are a volcanic weathered product and their principal constituents are aluminum oxide and silicic acid. They are converted by their reaction with an inorganic acid and thereby the so-called flocculant and coagulant aid are obtained at the same time.

FIELD OF THE INVENTION

The present invention relates to a process for preparing a flocculating agent for the treatment of an aqueous suspension, by treating allophane or clay minerals similar thereto with an inorganic acid.

DESCRIPTION OF THE PRIOR ART

The method of coagulation and sedimentation which comprises using chemicals called a flocculant and a coagulant aid has so far been known as a process for the treatment of an aqueous suspension. It is widely known that aluminum sulfate [$Al_2(SO_4)_3 \cdot 18H_2O$] or iron sulfate [$Fe_2(SO_4)_3$; $FeSO_4 \cdot 7H_2O$] is employed as the flocculant, and slaked lime [$Ca(OH)_2$], carbonic soda [$NaCO_3$], caustic soda [$NaOH$], highly polymerised electrolytes or the like is employed as the coagulant aid.

In such conventional treatment processes as the above, however, a flock (flocculent precipitate) is not well formed depending on temperature, quality and other conditions of an aqueous suspension, growth of the flock is so slow that the treatment cannot be carried out efficiently or various problems often arise in speed or effect of filtration during a step wherein the treated suspension of coagulation and sedimentation is subjected to filtration.

In 1936, Baylis of U.S.A. published a process for treating a suspension by employing an activated silicic acid as coagulant aid with the flocculant, and the process gives a remarkable effect on the coagulation and sedimentation treatment of an aqueous suspension and also a favorable effect on the filtration treatment even in such a case as the above. The Baylis process employs aluminum sulfate as the flocculant and silicic acid as the coagulant aid, that is, negative-charged colloidal silicic acid prepared by neutralizing sodium silicate (water glass) with alkali, and adds said coagulant aid to the aqueous suspension for aiding the flocculation of aluminum sulfate.

This process is, however, very troublesome, because it is necessary to add a dilute aqueous solution of sodium silicate with one member selected from the group consisting of sulfuric acid, aluminum sulfate, carbonic acid gas, ammonium sulfate, chlorine and the like and recuperate the mixture for several hours or more, and the process of activation is difficult. For example, according to the process of activation with sulfuric acid, sodium silicate is diluted with a solution containing 1.5% anhydrous silicic acid ($SiO_2$), the solution is added with sulfuric acid so that its alkalinity remains between 1000 deg. and 1800 deg., and, after it is left for several hours for activation, the resulting solution is diluted to have a concentration of 0.4% to 0.6% and is added with 3 to 4 parts of activated silicic acid for 10 parts of aluminum sulfate before, after or at the same time with the addition of aluminum sulfate. Although this process has a very strong flocculation effect, it has not so far been employed widely.

SUMMARY OF THE INVENTION

For solving these drawbacks, the present invention provides a process of simple operation for preparing a highly efficient flocculating agent for the treatment of an aqueous suspension, which comprises adding an inorganic acid to allophane or clay minerals similar thereto, carrying out the reaction of said mixture sufficiently, thereby converting and separating aluminum oxide and silicic acid, wherein aluminum oxide is converted to aluminum sulfate and silicic acid is converted to activated silicic acid sol by sulfuric acid treatment, and, in case of using said reaction product as the flocculating agent, taking out the aluminum sulfate phase and the activated silicic acid sol phase separately so that they can respectively be used as the flocculant and as the coagulant aid, especially by using the reaction product as it is in the form of stirred mixture. The coagulation and sedimentation effect due to aluminum sulfate and the subsidiary flocculation effect due to activated silicic acid can be displayed at the same time.

The allophane available for the present invention is a kind of natural clay mineral which has so far been employed for catalysts, adsorbents, fire-proofing and heat-insulating materials and the like. It is well known that allophane is widely distributed by nature as the volcanic weathered product in volcanic countries and is present in the vicinity of the earth's surface. It has also been reported that the presence of the allophane causes bad effects on agriculture products. Therefore, the significance of the present invention may be very large because fields are revived by removing the allophane to employ it as the flocculating agent. As for the chemical composition of the allophane, the principal constituents are aluminum oxide and silicic acid and the content of aluminum oxide is larger than in ordinary clay minerals. It is noncrystalline according to microscopic observation and X-ray examination. One example of the chemical analysis is 41% aluminum oxide ($Al_2O_3$), 39% silicic acid ($SiO_2$), 3.0% iron ($Fe_2O_3$), 0.45% magnesia ($MgO$) and 0.4% lime ($CaO$). The true specific gravity is 2.5 while the apparent specific gravity is 0.5.

The detailed explanation of the process according to the present invention is as follows.

The parent substance of the flocculating agent according to the present invention, natural allophane, is lightly ground in water to remove of the adulterants, is sufficiently dried at 105° C. to 110° C. in a thermostatic electric drying apparatus, and is ground to be prepared as the starting material by removing off the portion of more than 100 mesh in particle size.

A part (unit: g.) of said starting material is, for example, mixed with 5 parts to 30 parts (unit: cc.) of about 1 N sulfuric acid to be in the range of 0.25 to 3.0 N and reacts sufficiently under stirring and shaking. By carrying out the reaction for several tens minutes under heating or for several hours at normal temperature, the principal constituents of the allophane, aluminum oxide and silicic acid, are separated to two phases such as the aluminum sulfate phase in the upper part and the activated silicic acid sol in the lower part.

The reaction products thus obtained are respectively used as the flocculant and as the coagulant aid. By using the aluminum sulfate phase and the activated silicic acid sol phase in the form of sufficiently stirred admixture, it is possible to prepare a liquid flocculating agent which displays the coagulation and sedimentation effect due to aluminum sulfate and the subsidiary flocculation effect due to activated silicic acid remarkably at the same time.

An aqueous suspension solution to be treated is added with the adequate amount of said flocculating agent according to the turbidity, water temperature and other properties of said suspension solution and is admixed by stirring and thereby the coagulation and sedimentation treatment can be carried out very effectively.

The results of a comparative test of the coagulation and sedimentation effect between an example of the flocculating agent according to the present invention comprising the stirred admixture and an example of aluminum sulfate as widely used by itself are explained below.

As compared with the individual use of aluminum sulfate, in the case of using the flocculating agent according to the present invention the formation and growth of flock are more accelerated, the flock particles are larger, stronger and denser and the precipitation effect is more accelerated. The present flocculating composition has a sufficient flocculating ability where the turbidity is low or where no turbidity component is present or for an aqueous solution at about 0° C. Therefore, the filtration effect for the treated water is better, that is, the treated water of filtration becomes much cleaner and the treatment efficiency is improved by increasing the filtration speed, as compared with the water treated with only aluminum sulfate. Further, the flocculation is possible over a wide range of pH, and it is very easy to operate the treating apparatus.

As for the process for using activated silicic acid as the coagulant aid, there has been discussed whether activated silicic acid should be added before, after or at the same time with the addition of the flocculating agent. However, according to the present invention, both can be added at the same time and the trouble of addition of chemicals can be saved thereby. As regards the apparatus, the dissolving and feeding tank for aluminum sulfate, the recuperating tank of activated silicic acid, the diluting tank, the feed tank and the like are required in case of using aluminum sulfate and activated silicic acid according to the conventional process. However, in the present process, the mixing and feeding tanks of the allophane and 0.25 to 3.0 N sulfuric acid are only required and so the apparatus is simplified.

As regards the storage of chemicals, the preservation of the flocculating agent according to the present invention is relatively simple in comparison with a chemical such as aluminum sulfate which can hardly be preserved for a long time. As the flocculating agent according to the present invention is prepared by charging the previously determined amounts of powder allophane and sulfuric acid into the admixing and feed tank, depending upon necessities on all such occasions as it is used, the amounts of aluminum oxide and activated silicic acid sol can be adjusted to desired concentration by adequately adjusting the proportion of allophane and sulfuric acid. Further, the flocculating ability of the prepared flocculating agent is not varied at all for a long time of preservation.

In the present invention, according to the test results in case of using an inorganic acid such as nitric acid ($HNO_3$), hydrochloric acid (HCl) or the mixture of inorganic acids instead of sulfuric acid, the conversion of aluminum is almost the same with a case of using sulfuric acid but the flocculation effect is rather worse than in case of using sulfuric acid.

As the allophane or clay minerals similar thereto are treated with an alkaline agent (for example, NaOH, KOH, etc.) so that aluminum oxide and silicic acid can be produced, the alkaline agent was used and the same tests as in case of using sulfuric acid were carried out. According to the comparative test results, the solubility and the coagulation and sedimentation effect were superior in case of using sulfuric acid. That is, in case of using caustic soda, the same effect as in case of using sulfuric acid can be obtained by using the chemical in an amount of about 5 times that of sulfuric acid for the same amount of the allophane.

BRIEF EXPLANATION OF THE DRAWINGS

The drawings illustrate the coagulation and sedimentation effect of the aqueous suspension solution in case of using the flocculating agent according to the present invention.

PREFERRED EMBODIMENTS

The examples of the present invention are explained below.

EXAMPLE 1

After natural allophane was lightly ground in water, hard coarse particles and adulterants were removed and, the ground product was sufficiently dried at 105° C. to 110° C. in a thermostatic electric drying apparatus and was ground again, to prepare the particles of 100 mesh or less as the starting materials.

5.0 g. portions of said starting material were charged to 200 ml. conical flasks with stoppers, and, into such flasks as the above, 100 ml. of 0.1 N to 20 N sulfuric acids were further added respectively. After those were left at 18.5° C. of the solution temperature for 48 hours under appropriate shaking, the amounts of aluminum oxide and silicic acid produced in the sulfuric acid solution of each concentration and the mol ratio of the converted amounts of aluminum oxide and silicic acid were as shown in the following table.

| $H_2SO_4$ (N) | Amount of $Al_2O_3$ (mg./100 ml.) | Amount of $SiO_2$ (mg./100 ml.) | $SiO_2/Al_2O_3$ |
|---|---|---|---|
| 0.1 | 85 | 300 | 5.99 |
| 0.25 | 750 | 875 | 1.98 |
| 0.5 | 1215 | 1375 | 1.93 |
| 0.75 | 1375 | 1000 | 1.23 |
| 1.0 | 1475 | 690 | 0.79 |
| 1.5 | 1575 | 525 | 0.57 |
| 2.0 | 1635 | 400 | 0.41 |
| 2.5 | 1680 | 300 | 0.30 |
| 3.0 | 1700 | 225 | 0.23 |
| 4.0 | 1715 | 115 | 0.12 |
| 5.0 | 1730 | 25 | 0.002 |
| 7.5 | 1725 | 0 | 0 |
| 10.0 | 1745 | 0 | 0 |
| 15.0 | 1750 | 0 | 0 |
| 20.0 | 1755 | 0 | 0 |

Note.—Solution temperature: 18.5° C.

According to the above results, with increase in the concentration of sulfuric acid, the converted amount of aluminum oxide is sharply increased until the concentration reaches about 0.5 N, and thereafter is gradually increased and almost reaches the maximum at about 2.5 N. On the other hand, the converted amount of silicic acid is sharply increased until the concentration of sulfuric acid reaches about 0.5 N, but is lowered rapidly with increase in the concentration above 0.5 N, because of the formation of gel.

According to the experimental result of coagulation and sedimenation on the starting material thus obtained in this example, the coagulation and sedimentation effect was excellent in the range of approximately 0.1 to 2.0 in the mol ratio of the converted amounts of aluminum oxide and silici acid ($SiO_2/Al_2O_3$). This range corresponds to the range of 0.25 N to 3.0 N in the concentration of sulfuric acid.

Next, according to the present process, the converted amount of aluminum in case of using 100 cc. of 1 N sulfuric acid for each 0.5 g. of the allophane and other clay minerals was measured. The test result is a follows.

| Name of clay minerals | Applied amount (g.) | N—H₂SO₄, mg./100 cc. | Amount of Al, mg./100 cc. | Remark |
|---|---|---|---|---|
| Allophane | 5.0 | 100 | 780.0 | (¹) |
| Bentonite | 5.0 | 100 | 18.0 | (¹) |
| Attapulgite | 5.0 | 100 | 13.1 | (¹) |
| Diatomaceous earth | 5.0 | 100 | 33.9 | (¹) |
| Vermiculite | 5.0 | 100 | 127.3 | (¹) |
| Ooyaishi | 5.0 | 100 | 74.0 | (¹) |
| Zeolite | 5.0 | 100 | 35.3 | (¹) |
| Kaolinite | 5.0 | 100 | 45.0 | (¹) |

¹ Measured after adequate shaking at 18.5° C. for 48 hours.

According to said results, it is made clear that the conversion of aluminum is much easier in allophane than in other clay minerals. Further, the coagulation and sedimentation effect in case of using the flocculating agent of other clay minerals than allophane is much inferior to in case of using allophane.

EXAMPLE 2

50 g. of the same starting material as in Example 1 was added with 1000 ml. of 1 N sulfuric acid and was left at 19.0° C. of the solution temperature under adequate shaking, and the converted amount of aluminum was measured at each period. Thereby, it was made clear that about 85% of aluminum was converted after 4 hours, about 92% of aluminum after 6 hours and the further change was small after 10 hours, so the required time for the conversion of aluminum was about 6 hours.

After the conversion of aluminum reached the equilibrium, the production rate of aluminum oxide and sililic acid was measured, to obtain about 28% aluminum oxide and about 12.5% silicic acid for the starting material used. 0.1% iron oxide was slightly dissolved out and the ionic concentration of aluminum was 7780 p.p.m.

In case of constantly shaking, 95% or more of aluminum were converted within 2 to 4 hours and, in case of shaking at 50° C. under heating, 95% or more of aluminum was converted more quickly within 1 to 2 hours.

EXAMPLE 3

In case of using the flocculating agent obtained in Example 2, the result of the coagulation and sedimentation treatment test of the aqueous suspension solution is illustrated in the figure attached hereto as the Example No. 1. For comparing with the flocculating agent according to the present invention, the test was carried out in case of using aluminum sulfate on market sale individually (the Example No. 3) and in case of using as the coagulant aid activated silicic acid (prepared from sodium silicate on market sale) in addition to aluminum sulfate (on market sale) (the Example No. 2). The aqueous suspension used for the test had the turbidity of 500 deg., the alkalinity of 51 deg., the pH of 7.2 and the temperature of 18.5° C., and was subjected to 140 r.p.m rapid stirring for 1 minute and 40 r.p.m. slow stirring for 9 minutes. Then, after it was quietly left for 10 minutes and was precipitated, the turbidity of the clarified water was measured, to obtain such result as shown in the figure. It is clear that the product according to the present invention is much superior in comparison with other products. While the turbidity of clarified water is increased, to lower the treatment effect after the amount of aluminum sulfate reaches a certain value in cases of the Example Nos. 2 and 3, it is very advantageous according to the present invention because the treatment effect is not lowered and the suitable range of chemical addition is wide. The optimum condition of removing the turbidity is about 0.4 deg. at 30 p.p.m. aluminum sulfate according to the present invention, about 1 at 50 p.p.m. in the Example No. 2 and about 4.8 deg. at 50 p.p.m. in the Example No. 3. The product according to the present invention showed the excellent coagulation and sedimentation effect, in addition to small applied amount of chemicals.

What is claimed is:

1. A process for preparing a flocculating agent for use in the treatment of an aqueous suspension, comprising reacting allophane with sulfuric acid having a concentration of 0.25–4.0 N, the molar ratio of reacted aluminum oxide and silicic acid ($SiO_2/Al_2O_3$) in the reaction product being within the range of 0.2–2.0.

2. A flocculating agent for use in the treatment of aqueous suspensions prepared in accordance with the process of claim 1.

References Cited

UNITED STATES PATENTS

| | | | |
|---|---|---|---|
| 1,617,476 | 2/1927 | Christopher | 23—182 X |
| 1,932,832 | 10/1933 | Turrentine | 252—2 |
| 1,953,144 | 4/1934 | Wilson | 23—182 X |
| 2,234,285 | 3/1941 | Schworm | 252—175 |
| 3,110,564 | 11/1963 | Rodis | 23—182 |
| 3,116,973 | 1/1964 | Haden | 23—182 |

JOHN T. GOOLKASIAN, Primary Examiner

M. E. McCAMISH, Assistant Examiner

U.S. Cl. X.R.

23—52, 182; 210—51